(12) United States Patent
Huth

(10) Patent No.: US 8,967,316 B2
(45) Date of Patent: Mar. 3, 2015

(54) MOTOR VEHICLE WITH SENSORS ARRANGED ON A PIVOTING DEVICE

(71) Applicant: GM Global Technology Operations LLC, Detroit, MI (US)

(72) Inventor: Johannes Huth, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/799,459

(22) Filed: Mar. 13, 2013

(65) Prior Publication Data

US 2013/0270027 A1    Oct. 17, 2013

(30) Foreign Application Priority Data

Apr. 11, 2012   (DE) .......................... 10 2012 007 246

(51) Int. Cl.
*B60R 21/00* (2006.01)

(52) U.S. Cl.
USPC .......................................................... 180/271

(58) Field of Classification Search
USPC .................................. 180/271, 274; 280/735
See application file for complete search history.

(56) References Cited

U.S. PATENT DOCUMENTS 3,935,922 A *  2/1976  Cooper et al. ................ 180/168
4,158,841 A    6/1979  Wuechner et al.
4,420,238 A   12/1983  Felix
5,745,070 A    4/1998  Yamada
2010/0182199 A1  7/2010  Jeong

FOREIGN PATENT DOCUMENTS

| CN | 201257937 Y | 6/2009 |
|---|---|---|
| DE | 2147523 A1 | 3/1973 |
| DE | 10349210 A1 | 5/2005 |
| DE | 102005055087 A1 | 5/2007 |
| DE | 102008049207 A1 | 1/2010 |
| DE | 102009010193 A1 | 8/2010 |
| DE | 202009010193 U1 | 12/2010 |
| GB | 2469738 A | 10/2010 |
| JP | 2002154383 A | 5/2002 |
| JP | 2002204446 A | 7/2002 |
| JP | 2004205398 A | 7/2004 |
| JP | 2005231450 A | 9/2005 |
| JP | 2006168683 A | 6/2006 |

OTHER PUBLICATIONS

German Patent Office, German Patent Search Report for Application No. 102012007246.5, dated Jan. 10, 2013.

* cited by examiner

*Primary Examiner* — Faye M. Fleming
(74) *Attorney, Agent, or Firm* — Ingrassia Fisher & Lorenz, P.C.

(57) ABSTRACT

A motor vehicle, comprising one or more sensors is provided. The one or more sensors are arranged on at least one pivoting device. The sensors are arranged on the at least one pivoting device in such a manner, that an orientation of the sensors can be panned or tilted relative to a vehicle longitudinal axis.

12 Claims, 2 Drawing Sheets

MOTOR VEHICLE WITH SENSORS ARRANGED ON A PIVOTING DEVICE

CROSS-REFERENCE TO RELATED APPLICATION

This application claims priority to German Patent Application No. 10 2012 007 246.5, filed Apr. 11, 2012, which is incorporated herein by reference in its entirety.

TECHNICAL FIELD

The technical field relates to a motor vehicle with one or a plurality of sensors, which are arranged on a pivoting device for sensing the surroundings, in particular the area ahead of the motor vehicle.

BACKGROUND

To avoid accidents, regular motor vehicles are increasingly equipped with active driving assistance systems, which comprise a multiplicity of sensors. On the one hand, the sensors in this case have to satisfy maximum requirements in terms of accuracy and reliability and be cost-effective and preferably small at the same time.

With the increasing use of active driving assistance systems in motor vehicles, the number of the sensors arranged in a front region of the motor vehicle also increases. This relates for example to distance and/or rain sensors. However, means for communication and means for location determination and object sensing are also frequently arranged in the front area of the motor vehicle. These will then have to be arranged in such a manner that they are able to carry out their function as optimally as possible, i.e. to be able to optimally scan the surroundings of the motor vehicle and in a largely unimpaired manner.

In the case of regular active driving assistance systems in motor vehicles, the means for location determination and object sensing in particular are arranged outside the interior of the motor vehicle in a fixed and immovable manner, such that their field of vision is directed to the vehicle longitudinal direction. In addition, the field of vision of such sensors is further restricted through predetermined sensing angles, which proves to be disadvantageous for example when changing lanes or when cornering.

From the publication DE 10 2009 018 515 A1 a camera device is known, in the case of which the camera sensor is pivotably arranged relative to its bearing surface within a housing of the camera device.

In addition, other objects, desirable features and characteristics will become apparent from the subsequent summary and detailed description, and the appended claims, taken in conjunction with the accompanying drawings and this background.

SUMMARY

Accordingly, the present disclosure provides a motor vehicle, in which the sensors are positioned such that these can carry out their function as optimally as possible at any time regardless of the driving situation.

According to an exemplary embodiment of the present disclosure, a motor vehicle is stated which comprises one or a plurality of sensors, which are arranged on at least one pivoting device, wherein the sensors are arranged on the at least one pivoting device in such a manner that an orientation of the sensors relative to a vehicle longitudinal axis can be panned or tilted.

Such a motor vehicle has the advantages that the sensors can be positioned in such a manner that these can carry out their function at any time, as optimally as possible, regardless of the driving situation. Since the orientation of the sensors can be panned or tilted relative to a vehicle longitudinal axis, their field of vision is not restricted to a predetermined angle, but can be dynamically changed. This proves to be advantageous for example when the motor vehicle is cornering or changing lanes since in this case not only a predetermined angle in vehicle longitudinal direction but also regions laterally next to the motor vehicle are important, for example for sensing approaching and overtaking motor vehicles. This in turn results in an increased effectiveness of active driving assistance systems, as a result of which in turn the risk of accidents can be significantly reduced.

One or a plurality of sensors can be means for position finding and object sensing. Means for position finding and object sensing, which are usually arranged on an outside of a motor vehicle, are employed in motor vehicles in a large number of active driving assistance systems, for example in the case of lane changing assistance. In that the means for position detection and object sensing are pannably or pivotably arranged, objects in the surroundings of the motor vehicle can be better scanned, for example a lane. The improved accuracy in the sensing of objects in turn leads to a significantly more precise interpretation and evaluation of scenarios during the use of a motor vehicle and to an improved target object sensing.

Here, the means for position finding and object sensing can relate to a camera and/or a radar and/or a lidar sensor. Such sensors are known as parts of active driving assistance systems for regular motor vehicles, which is why these can be easily integrated in the vehicle and activated, without expensive and complicated conversions having to be necessary in such a case. In addition, these are characterized by their long range and characteristic as long-range sensors, which is why these are particularly suited for sensing an object in the surroundings of the motor vehicle. Furthermore, the means for position finding and object sensing however can also relate to mechanical vision means and/or further modules for position finding.

According to an exemplary embodiment, the pivoting device is arranged such that the sensors can be panned or tilted as a function of a driving direction of the motor vehicle. Driving direction in this case is to mean the movement direction of the motor vehicle.

According to one embodiment, the pivoting device can also be coupled to a steering wheel of the motor vehicle in such a manner that the sensors can be panned or tilted as a function of a steering angle of the steering wheel of the motor vehicle. Steering angle in this case is to mean the angle by which a user of the motor vehicle turns the steering wheel in order to bring about a directional change of the motor vehicle.

The pivoting device can also be coupled to a front wheel of the motor vehicle such that the sensors can be panned or tilted as a function of a front wheel angle of a front wheel of the motor vehicle. Front wheel angle in this case is to mean the angle by which the front wheels of a motor vehicle turn as a result of a directional change.

Because of this it can be ensured that the surroundings of the motor vehicle can also be scanned optimally and largely unimpaired also in the case of directional changes, since the field of vision of the sensors is not restricted to a predetermined angle, but upon a directional change of the motor vehicle can likewise be panned or tilted in this direction. This in turn results in an expanded and improved sensing of original data when cornering or changing lanes and thus in an improved accuracy in the sensing of objects. The improved accuracy in the sensing of objects leads to a significantly more precise interpretation and evaluation of scenarios during the use of a motor vehicle and thus to an increased accuracy and reliability of active driving assistance systems, which in turn result in a reduced risk of accidents.

Here, the motor vehicle can further comprise an electronic control unit which is coupled to the at least one pivoting device in such a manner that the electronic control unit can instruct the at least one pivoting device to pan or tilt the orientation of the one or a plurality of sensors. Through the electronic coupling and activation of the at least one pivoting device, justice can be done to increasing comfort requirements in motor vehicles and to an increasing number of external systems, for example for communication or infotainment in motor vehicles. In this case, collected signals for example a turning of the steering wheel or of the front wheel of the motor vehicle are transmitted to an electronic control unit which in turn instructs the pivoting device to carry out certain actions corresponding to the collected signals, i.e. to suitably pan or tilt the orientation of the sensors. The transmission of the signals in this case can be effected in a wire-based or wireless manner, for example by means of Bluetooth technology. Furthermore, however, all other technologies of wire-based or wireless networks can also be utilized for the data exchange.

Here, the pivoting device can comprise an engagement device for positioning the sensors in a desired position. Because of this, unintentional movements, i.e. an unintentional panning or tilting of the orientation of the sensors can be substantially reduced. The panning or tilting in this case can be effected over a plurality of engagement positions, so that for example as a function of a driving direction, of a steering angle of the steering wheel of the motor vehicle or a front wheel angle of the front wheel an engagement position is set which ensures the optimal orientation of the sensors.

According to an exemplary embodiment, a sensor each in this case is arranged on a pivoting device. Thus it can be ensured that the sensors can be arranged in each case independently of one another corresponding to their function and position on the vehicle in such a manner that they are able to carry out their function as optimally as possible, i.e. to optimally scan the surroundings of the motor vehicle in a largely unimpaired manner.

Furthermore, the sensors can also be arranged bundled on a pivoting device. The bundling of the sensors has the advantage that a device for receiving sensors can be provided in particular in the front area of a motor vehicle, which is embodied as a single component and can be mounted in an easy and cost-effective manner. Since more than one sensor can be integrated in the installation space of the housing, these can be cost-effectively integrated in the motor vehicle, since additional housings for sensors, in particular for means for position finding and object sensing, which are usually arranged outside an interior space of the motor vehicle, can be omitted.

In summary it must be noted that with the present disclosure a motor vehicle is stated, with which the sensors are positioned in such a manner that these can carry out their function as optimally as possible at any time regardless of the driving situation. Since the sensors are arranged on a pivoting device in such a manner that their orientation can be panned or tilted, these can carry out their function as optimally as possible even in the case of directional changes of the motor vehicle, for example when changing lanes or cornering, i.e. optimally scan the surroundings of the motor vehicle and largely in an unimpaired manner.

Since the sensors generally relate to means for position finding and object sensing, the accuracy and reliability of active driving assistance systems in motor vehicles can be increased, since the sensors can be integrated in the motor vehicle in such a manner that an inclination angle of the sensors is always orientated with respect to an optimal orientation even upon a directional change of the motor vehicle.

Furthermore, the sensors can be panned or tilted as a function of a driving direction, of a steering angle of a steering wheel of the motor vehicle or of a front wheel angle of the front wheel of the motor vehicle, thus orientated at any time in such a manner that these can optimally scan the surroundings of the motor vehicle even when changing lanes or when cornering.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
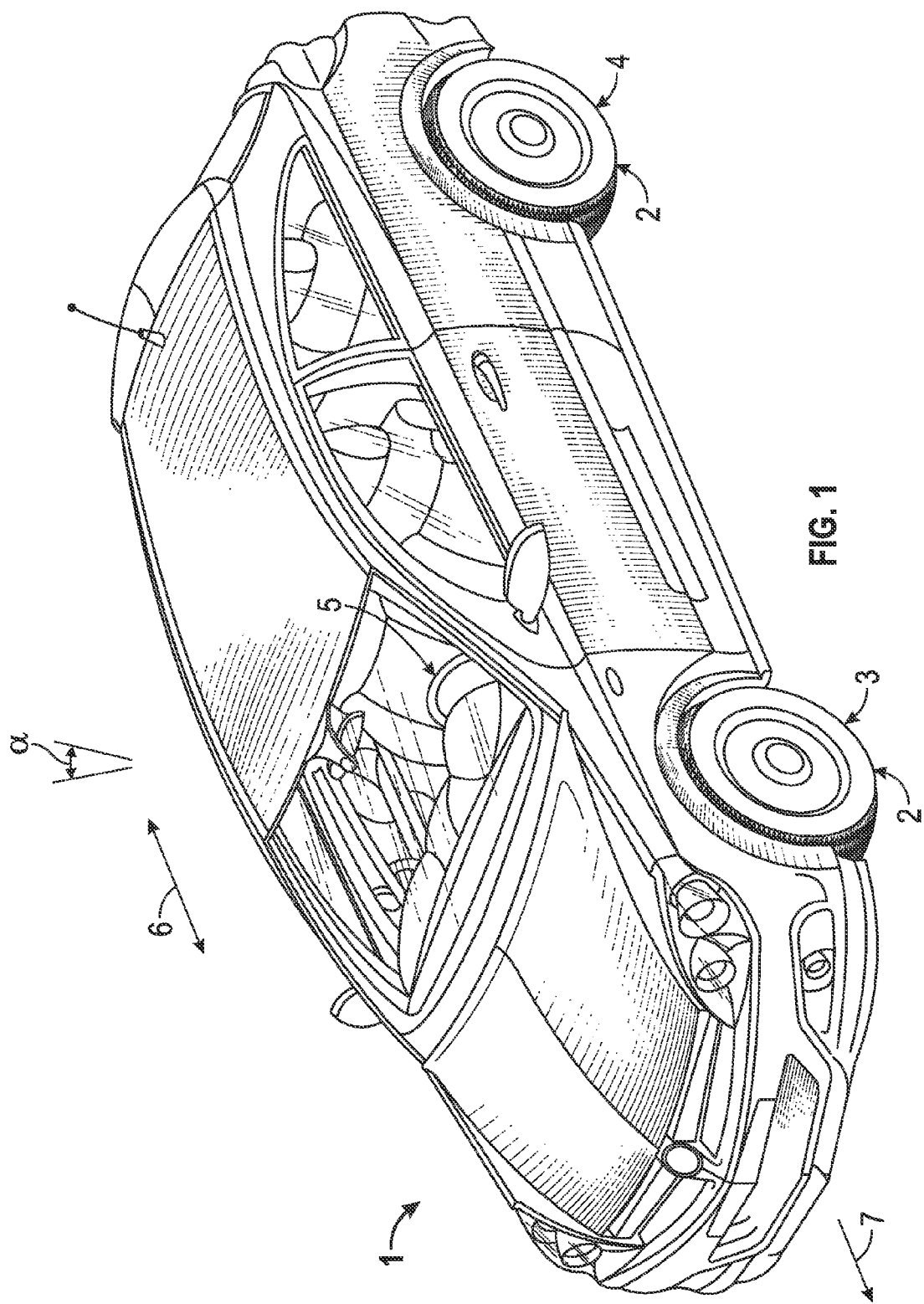
FIG. 1 shows a schematic perspective oblique view of a motor vehicle according to various embodiments of the present disclosure.

FIG. 1 shows a schematic perspective oblique view of a motor vehicle 1 according to various embodiments of the present disclosure.

As is shown in FIG. 1, the vehicle comprises wheels 2, in particular front wheels 3 and rear wheels 4, for locomotion of the motor vehicle 1, i.e. for power transmission from a vehicle structure to a road.

Furthermore, the motor vehicle 1 comprises a steering wheel 5 with which the wheels 2 of the motor vehicle 1 can be pivoted for bringing about a directional change of the motor vehicle 1, for example in order to negotiate a curve.

Furthermore, the motor vehicle comprises a plurality of sensors which are not shown in FIG. 1, which are arranged on at least one pivoting device in such a manner that an orientation of the sensors relative to a vehicle longitudinal axis can be panned or tilted. The vehicle longitudinal axis in this case is symbolized by the arrow provided with reference number 6.

The one or the plurality of sensors relates to means for position finding and object sensing, which are part of active driving assistance systems in regular motor vehicles 1.

In the exemplary embodiment of FIG. 1, the sensors in this case can be panned or pivoted as a function of a driving direction, wherein the driving direction is symbolized by the arrow provided with reference number 7. Driving direction in this case is to mean the movement direction of the motor vehicle.

Furthermore, the at least one pivoting device is coupled to the steering wheel of the motor vehicle in such a manner that the sensors can be panned or tilted as a function of a steering angle α of the steering wheel 5 of the motor vehicle 1. Steering angle in this case is to mean the angle by which a user of the motor vehicle turns the steering wheel in order to bring about a directional change of the motor vehicle.

Furthermore, the at least one pivoting device however can also be designed in a manner to pan or tilt the orientation of the one or of the plurality of sensors as a function of a front wheel angle of the front wheels 4 of the motor vehicle. Front wheel angle in this case is to mean the angle by which the front wheels of motor vehicles turn as a result of a directional change.

Because of this it can be ensured that the orientation of the one or of the plurality of sensors is arranged regardless of a driving situation in such a manner that the sensors can carry out their function as optimally as possible, i.e. scan the surroundings of the motor vehicle 1 optimally and largely in an unimpaired manner.

Figure 2:
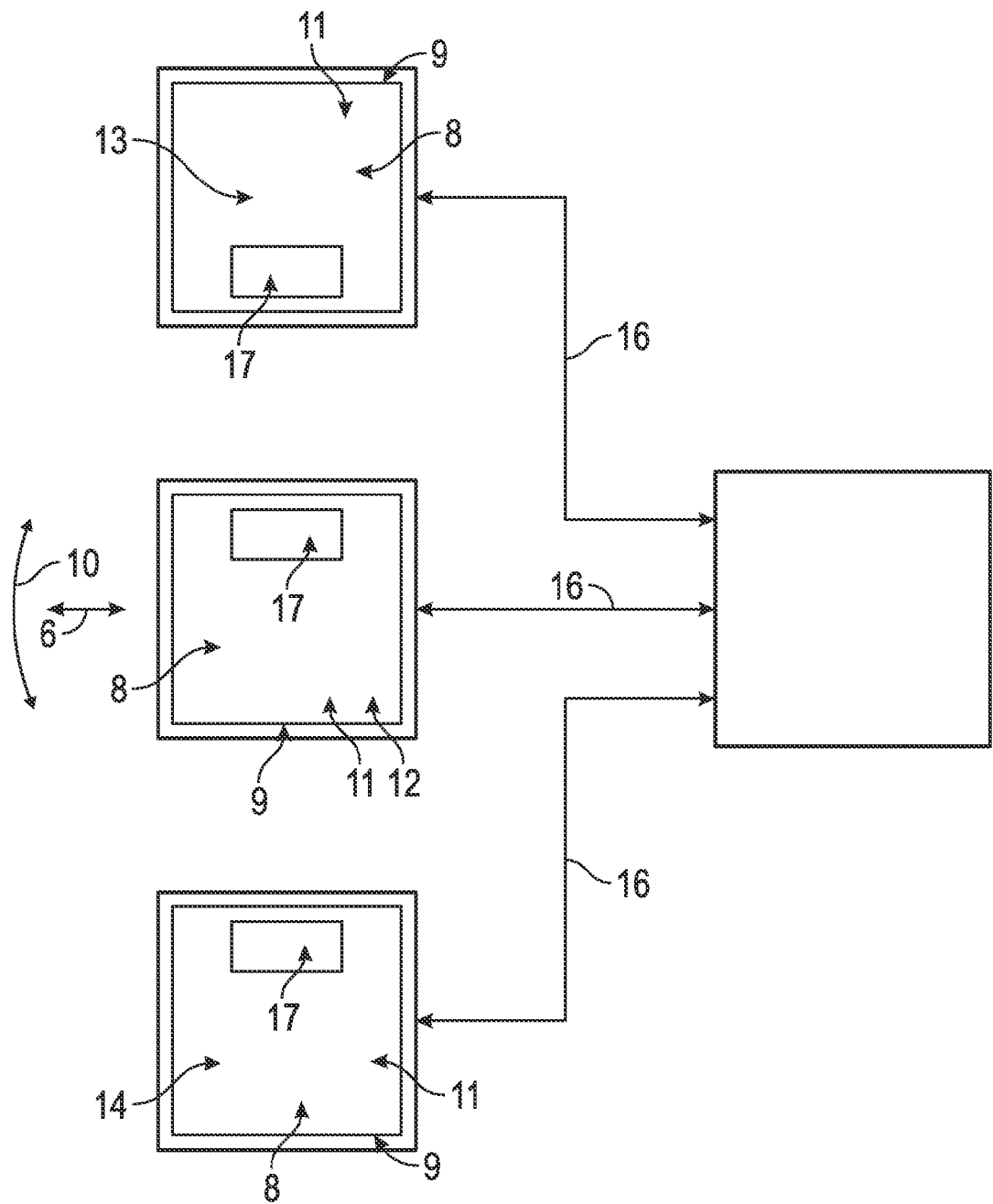
FIG. 2 shows a block diagram of an exemplary embodiment of the present disclosure.

FIG. 2 shows a block diagram of the present disclosure according to an exemplary embodiment. Components with same function or design as in FIG. 1 are provided with the same reference characters and are not explained separately.

FIG. 2 shows more than 1 sensors 8 and pivoting devices 9, wherein the sensors 8 are arranged on the pivoting devices 9 in such a manner that an orientation of the sensors 8 can be panned or tilted relative to a vehicle longitudinal axis. In this case, the vehicle longitudinal axis in turn is symbolized by the arrow provided with the reference number 6 and the panning or tilting of the orientation of the sensors 8 is represented by the arrow provided with reference number 10.

The sensors 8 in this case are means for position finding and object sensing 11, which are part of active driving assistance systems in regular motor vehicles 1.

The exemplary embodiment of FIG. 2 specifically relates to a camera 12, a radar 13 and a lidar senor 14. These sensors 12, 13, 14 are excellently suitable, in particular because of this long range and characteristic as long-range sensors for sensing a surroundings of the motor vehicle 1 and for detecting objects within the surroundings of the motor vehicle 1.

Furthermore, FIG. 2 shows an electronic control unit 15, which is coupled to the pivoting devices 9. The coupling in this case is symbolized by the arrows provided with reference number 16.

Here, data, for example a driving direction, a steering angle α of a steering wheel 5 of the motor vehicle 1 or a front wheel angle β of a front wheel 3 of the motor vehicle 1 are collected via the electronic control unit 15 and passed on to the pivoting devices 9, which as reaction to these can pan or tilt the orientation of the sensors 8 relative to a vehicle longitudinal axis. The transmission of the collected data in this case can also be effected in a wire-based or wireless manner, for example by means of Bluetooth technology.

Furthermore, however, other technologies known in wire-based or wireless networks can also be employed for the data exchange.

The shown pivoting devices 9 in this case additionally comprise an engagement device 17 each for positioning the sensors 8 in a desired position. Thus, the risk of unintentional movements, i.e. an unintentional changing of the orientation of the sensors 8 can be reduced and the panning or tilting in this case be effected via several engagement positions, so that an engagement position can be set which ensures the optimal orientation of the sensors 8.

In the case of the exemplary embodiment of FIG. 2, a sensor 8 each is arranged on a pivoting device 9. Thus it can be ensured that the sensors 8 can each be orientated independently of one another in such a manner that these can carry out their function as optimally as possible at any time, regardless of a driving situation. Furthermore, the sensors 8 however can also be arranged bundled on a pivoting device 9.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle, comprising:
   one or more sensors that are arranged on at least one pivoting device,
   wherein the sensors are arranged on the at least one pivoting device in such a manner that an orientation of the sensors is movable relative to a vehicle longitudinal axis;
   wherein the at least one pivoting device is coupled to a steering wheel of the motor vehicle in such a manner that the sensors are movable as a function of a steering angle of the steering wheel of the motor vehicle.

2. The motor vehicle according to claim 1, wherein the one or more sensors relate to means for position finding and object sensing.

3. The motor vehicle according to claim 2, wherein the means for position finding and object sensing comprise at least one of a camera, a radar sensor and a lidar sensor.

4. A motor vehicle, comprising:
   one or more sensors that are arranged on at least one pivoting device,
   wherein the sensors are arranged on the at least one pivoting device in such a manner that an orientation of the sensors is movable relative to a vehicle longitudinal axis;
   wherein the at least one pivoting device is coupled to a front wheel of the motor vehicle in such a manner that the sensors are movable as a function of a front wheel angle of a front wheel of the motor vehicle.

5. The motor vehicle according to claim 4, wherein the motor vehicle comprises an electronic control unit, which is coupled to the at least one pivoting device in such a manner that the electronic control unit instructs the at least one pivoting device to move the sensors.

6. The motor vehicle according to claim 4, wherein a sensor each is arranged on one of the at least one pivoting device.

7. The motor vehicle according to claim 4, wherein the sensors are arranged bundled on a single pivoting device.

8. A motor vehicle, comprising:
   one or more sensors that are arranged on at least one pivoting device;
   wherein the sensors are arranged on the at least one pivoting device in such a manner that an orientation of the sensors is movable relative to a vehicle longitudinal axis; and an electronic control unit, which is coupled to the at least one pivoting device in such a manner that the electronic control unit instructs the at least one pivoting device to move the sensors;

wherein the at least one pivoting device is coupled to a steering wheel of the motor vehicle in such a manner that the sensors are movable as a function of a steering angle of the steering wheel of the motor vehicle.

9. The motor vehicle according to claim 8, wherein the at least one pivoting device comprises an engagement device for positioning the sensors in a desired position.

10. The motor vehicle according to claim 8, wherein a sensor each is arranged on one of the at least one pivoting device.

11. The motor vehicle according to claim 8, wherein the sensors are arranged bundled on a single pivoting device.

12. A motor vehicle, comprising:
one or more sensors that are arranged on at least one pivoting device;
wherein the sensors are arranged on the at least one pivoting device in such a manner that an orientation of the sensors is movable relative to a vehicle longitudinal axis; and
an electronic control unit, which is coupled to the at least one pivoting device in such a manner that the electronic control unit instructs the at least one pivoting device to move the sensors;
wherein the at least one pivoting device is coupled to a front wheel of the motor vehicle in such a manner that the sensors are movable as a function of a front wheel angle of a front wheel of the motor vehicle.

* * * * *